(12) United States Patent
Ohashi et al.

(10) Patent No.: US 12,002,644 B2
(45) Date of Patent: Jun. 4, 2024

(54) PANEL ATTACHMENT FIXTURE AND SHIP OPERATION PANEL STRUCTURE

(71) Applicant: Yanmar Power Technology Co., Ltd., Osaka (JP)

(72) Inventors: Ryosuke Ohashi, Osaka (JP); Koichi Kanda, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 515 days.

(21) Appl. No.: 17/288,507

(22) PCT Filed: Sep. 24, 2019

(86) PCT No.: PCT/JP2019/037296
§ 371 (c)(1),
(2) Date: Feb. 3, 2022

(87) PCT Pub. No.: WO2020/084982
PCT Pub. Date: Apr. 30, 2020

(65) Prior Publication Data
US 2022/0172906 A1 Jun. 2, 2022

(30) Foreign Application Priority Data
Oct. 25, 2018 (JP) ................................. 2018-200473

(51) Int. Cl.
*H01H 9/02* (2006.01)
*B63H 21/21* (2006.01)
*H02B 1/40* (2006.01)

(52) U.S. Cl.
CPC ............... *H01H 9/02* (2013.01); *B63H 21/21* (2013.01); *H02B 1/40* (2013.01); *B63H 2021/216* (2013.01)

(58) Field of Classification Search
CPC ...... H01H 9/02; H01H 9/0207; H01H 9/0242; H01H 13/04; H02B 1/40; H02B 1/42;
(Continued)

(56) References Cited

U.S. PATENT DOCUMENTS 5,160,809 A * 11/1992 Yang ...................... H02G 3/185
174/57
5,589,664 A * 12/1996 Rode ....................... G01P 3/487
174/520

(Continued)

*Primary Examiner* — Angel R Estrada
(74) *Attorney, Agent, or Firm* — Chris Mizumoto

(57) ABSTRACT

Provided is a technology pertaining to a panel attachment fixture wherein a single or a pair of electrical components can be efficiently arranged on an attachment-receiving panel by use of a common fixture body, said panel attachment fixture has predetermined electric components such as switches disposed on the front surface of a flange section thereof and can be attached to the attachment-receiving panel in a state in which a body section protruding rearward from the back surface of the flange section is inserted in an attachment opening of the attachment-receiving panel. The body section has on the periphery thereof: a first member fitting part to which a single first attachment member serving as an attachment member is fitted in an independent-attachment state for independently attaching a single fixture body to the attachment-receiving panel; and a second member fitting part to which a single second attachment member serving as an attachment member is fitted in a parallel-attachment state for attaching one pair of fixture bodies to the attachment-receiving panel, with the fixture bodies being arranged parallel to each other along a first direction in an in-plane direction of the attachment-receiving panel.

9 Claims, 11 Drawing Sheets

(58) Field of Classification Search
CPC ... H02B 1/46; H02B 1/48; H02B 1/30; B63H 21/21; B63H 2021/216; H02G 3/08; H02G 3/081; H02G 3/10; H02G 3/12; H02G 3/121; H02G 3/123
USPC ... 174/61, 50, 520, 480, 481, 483, 535, 559, 174/58, 650, 659, 560, 561, 53, 54; 220/3.2–3.9, 4.02; 248/906, 68.1, 49; 16/2.1, 2.2
See application file for complete search history.

(56) References Cited

U.S. PATENT DOCUMENTS

| | | | | |
|---|---|---|---|---|
| 5,594,201 | A * | 1/1997 | Reinert, Sr. | F21V 21/14 174/481 |
| 5,881,864 | A * | 3/1999 | Shelhorse | H01H 3/12 174/53 |
| 8,115,122 | B2 * | 2/2012 | Machida | H01H 3/022 200/16 A |
| 8,410,378 | B1 * | 4/2013 | Senseney | H02G 3/0683 174/650 |
| 8,789,239 | B2 * | 7/2014 | Stewart | H02G 3/22 16/2.2 |
| 10,971,908 | B2 * | 4/2021 | Thompson | F16B 37/145 |
| 11,056,867 | B2 * | 7/2021 | Obrist | H02G 3/123 |

\* cited by examiner

PANEL ATTACHMENT FIXTURE AND SHIP OPERATION PANEL STRUCTURE

CROSS-REFERENCE

This application is a US National Stage Application under 35 U.S.C. § 371 of International Application No. PCT/JP2019/037296 filed Sep. 24, 2019, which claims foreign priority of JP2018-200473 filed Oct. 25, 2018, the disclosures of which are hereby incorporated by reference in their entirety.

TECHNICAL FIELD

The present invention relates to a panel attachment fixture attachable to an attachment-receiving panel while predetermined electrical components, such as switches, are disposed on the front face of a flange section, and a body section protruding rearward from the back face of the flange section is passed through an attachment opening in the attachment-receiving panel; more specifically, the present invention relates to a panel attachment fixture used in a ship operation panel structure in which one or two engine start switches are disposed on an attachment-receiving panel.

BACKGROUND ART

An operation panel structure for a ship provided with a single propulsion engine includes one engine start switch for starting the single propulsion engine is disposed. However, an operation panel structure for a ship provided with two propulsion engines (for example, refer to PTL 1) includes two engine start switches for starting the two propulsion engines.

There has been known a conventional operation panel structure for disposing electrical components, such as multiple switches, on an attachment-receiving panel in which a flange section integrated with the multiple electrical components is manufactured and the flange section is attached to the attachment-receiving panel (for example, refer to PTL 2).

There has been also known a conventional operation panel structure for disposing one single electrical component alone on an attachment-receiving panel in which a panel attachment fixture including a fixture body including a flange section and a body section (for example, refer to PTL 3). A single electrical component is disposed on the front face of the flange section. The body section protrudes rearward from the back face of the flange section. The outer circumference of the body section is provided with a threaded portion on which an attachment nut can be fitted. In such a panel attachment fixture, the fixture body is attached to the attachment-receiving panel by inserting the body section to an attachment opening from the front side and fitting an attachment nut to the threaded portion from the back side.

CITATION LIST

Patent Literature

[PTL 1] Japanese Unexamined Patent Publication No. 2017-178290
[PTL 2] Japanese Unexamined Patent Publication No. 2018-103889
[PTL 3] Japanese Unexamined Patent Publication No. 9-50725

DISCLOSURE OF INVENTION

Problems to be Solved by the Invention

In the case of a ship operation panel structure in which electrical components, such as one or two engine start switches, are disposed on an attachment-receiving panel, manufacturing a fixture body having a flange section integrated with all electrical components to be disposed, as in the operation panel structure of PTL 2, causes problems such as an increase in manufacturing cost, complication of inventory control, etc., because the fixture body must have a different shape depending on the number of electrical components to be disposed.

In the case where two electrical components are disposed on the attachment-receiving panel, if the two electrical components are respectively attached to the attachment-receiving panel with individual panel attachment fixtures, the fixture bodies for attaching the respective electrical components can be standardized, and thereby the manufacturing cost can be reduced. However, in such a case, interference between attachment members, such as attachment nuts, fitted to the two fixture bodies is a problem, and it becomes difficult to reduce the distance between the two fixture bodies. This result in a problem of not being able to efficiently arrange the two electrical components on the attachment-receiving panel.

In view of this situation, an object of the present invention is to provide a technique that allows efficient arrangement of one or two electrical components on an attachment-receiving panel while using a common fixture body.

Means for Solving the Problems

According to a first aspect of the present invention, a panel attachment fixture includes a fixture body including a flange section having a front face on which a predetermined electrical component is disposed and a body section protruding rearward from a back face of the flange section and having an outer circumference provided with a member fitting portion fittable with an attachment member, the fixture body is attachable to the attachment-receiving panel while the attachment member is fitted, from the back side, to the member fitting portion against the body section passed, from the front side, through an attachment opening in the attachment-receiving panel, and the outer circumference of the body section includes the following as the member fitting portion: a first member fitting portion to which a single first attachment member, which is the attachment member, is fitted in a single attachment state in which one fixture body is attached to the attachment-receiving panel alone; and a second member fitting portion to which a single second attachment member, which is the attachment member, is fitted in a parallel attachment state in which a pair of the fixture bodies are attached to the attachment-receiving panel, with the fixture bodies being arranged in parallel to each other along a first direction in an in-plane direction in the attachment-receiving panel.

According to this aspect, in the single attachment state, the body section of one fixture body is inserted into the attachment opening of the attachment-receiving panel. In this state, for example, the first attachment member, which is an annular attachment member surrounding the body section, is fitted to the first member fitting portion provided on the outer circumference of the body section. In this way, the one fixture body can be attached to the attachment-receiving panel, and the electrical component, such as a switch, disposed on the flange section of the one fixture body can be disposed on the attachment-receiving panel.

In the parallel attachment state, two fixture bodies each having a flange section and a body section that are the same as those of the fixture body used in the single attachment state, and the body sections of the two fixture bodies that are disposed in parallel in the first direction in the in-plane direction of the attachment-receiving panel are inserted in the attachment opening of the attachment-receiving panel. In this state, the second attachment member, which is an attachment member separate from the first attachment member, is fitted to the second member fitting portion provided on the outer circumference of the respective body sections. In this way, the two fixture bodies arranged in parallel in the first direction can be attached to the attachment-receiving panel, and the electrical component, such as a switch, disposed on the flange sections of the two fixture bodies can be disposed on the attachment-receiving panel.

Furthermore, in the parallel attachment state, since two fixture bodies arranged in parallel are attached to the attachment-receiving panel using one second attachment member, the distance between the two fixture bodies can be reduced in comparison with a case in which the two fixture bodies are attached with separate attachment members because the attachment members do not interfere with each other.

Therefore, the present invention provides a panel attachment fixture in which one or two electrical components can be efficiently arranged on an attachment-receiving panel while using common fixture bodies.

According to a second aspect of the present invention, on the outer circumference of the body section, the first member fitting portion is disposed on the inner side of the second attachment member while the second attachment member is in the state fitted to the second member fitting portion, and the second member fitting portion is disposed on the inner side of the first attachment member while the second member fitting portion is in the state fitted to the first member fitting portion.

According to this aspect, in the single attachment state, the first attachment member for attaching one fixture body to the attachment-receiving panel can be smoothly fitted to the first member fitting portion disposed on the outer circumference of the body section without interference with the second member fitting portion separately disposed on the outer circumference of the body section. In the parallel attachment state, the second attachment member for attaching two fixture bodies arranged in parallel to the attachment-receiving panel can be smoothly fitted to the second member fitting portion disposed on the outer circumference of each of the body sections without interference with the first member fitting portion separately disposed on the outer circumference of each of the body sections.

According to a third aspect of the present invention, the body section has a substantially rectangular parallelepiped shape flat in the first direction, and
on the outer circumference of the body section, the first member fitting portion is disposed on narrow faces facing each other along a second direction orthogonal to the first direction in the in-place direction of the attachment-receiving panel, and the second member fitting portion is disposed on corner portions a side face of one side along the first direction of the narrow faces where the first member fitting portion is provided.

According to this aspect, since the body section of the fixture body has a substantially rectangular parallelepiped shape flat in the first direction, the narrow faces that face each other in the second direction orthogonal to the first direction on the outer circumference are each positioned farthest outward from the axis core of the body section. Since the first member fitting portion is provided on each narrow face, in the single attachment state, the annular first member fitting portion can be fitted to each first member fitting portion from the outside in a well-balanced manner.

In the parallel attachment state, since the body section of each of the two fixture bodies arranged in parallel in the first direction has a substantially rectangular parallelepiped shape flat in the first direction, the two fixture bodies can be disposed more closely together. Furthermore, since the second member fitting portion is disposed at each corner portion adjacent to each narrow face on the outer circumference of the body second of each fixture body, in the parallel attachment state, the second member fitting portion can be disposed on each of the four corner portions on the outer circumferences of the body sections of the two fixture bodies arranged in parallel, the annular second member fitting portion can be fitted to the second member fitting portions from the outside in a well-balanced manner.

Furthermore, by forming each of the flange sections in a substantially rectangular shape with the short side along the first direction in the front view, the two fixture bodies can be disposed closer while the flange sections are arranged in parallel, and the long sides of the substantially rectangular shape are disposed adjacent to each other in the parallel attachment state.

According to a fourth aspect of the present invention, in addition to the third aspect, the first member fitting portion and the second member fitting portion are threaded portions of different diameters with threads formed, and
the first attachment member and the second attachment member are attachment nuts of different diameters that are screwed onto the threads of the threaded portions.

According to this aspect, the annular attachment nut can be fitted to the threaded portion provided on the outer circumference of the body section while the body section of each fixture body is passed through the attachment opening of the attachment-receiving panel, and the fixture body can be attached to the attachment-receiving panel. In such case, also, the fixture bodies can be attached to the attachment-receiving panel in two different attachment state, i.e., the single attachment state and the parallel attachment state, by using common fixture bodies, by simply preparing the first attachment nut and the second attachment nut having different diameters as attachment members.

According to a fifth aspect of the present invention, in addition to the third and fourth aspects, a wiring outlet is formed on the outer circumference of the body section on a side face on the other side along the first direction of the narrow faces provided with the first member fitting portion, the wiring outlet passes a wiring connected to the electrical component through a space in the body section.

According to this aspect, the wiring outlet is formed on the outer circumference of the body section of each fixture body on the side face opposite to the side face sandwiched between the corner portions where the second member fitting portion is disposed. As a result, in the parallel attachment state, it is possible to suppress interference with the second attachment member that surrounds the body section of each fixture body arranged in parallel and allow the wiring to pass through each wiring outlet.

According to a sixth aspect of the present invention, a ship operation panel structure in which one or two engine start switches are disposed on an attachment-receiving panel, the structure including:

the panel attachment fixture according to any one of the first to fifth aspects, wherein the one or two engine start switches are disposed on the flange section as the electrical component, and the fixture body is attached to the attachment-receiving panel in the single attachment state or the parallel attachment state.

According to this aspect, even in a ship equipped with one or two engines, by adopting the panel attachment fixture according to the present invention described above as a panel attachment fixture to be used in a ship operation panel structure, one or two engine start switches can be reasonably and efficiently arranged on an attachment-receiving panel.

DESCRIPTION OF EMBODIMENTS

Embodiments of a panel attachment fixture of the present invention will now be described with reference to the drawings.

Figure 5:
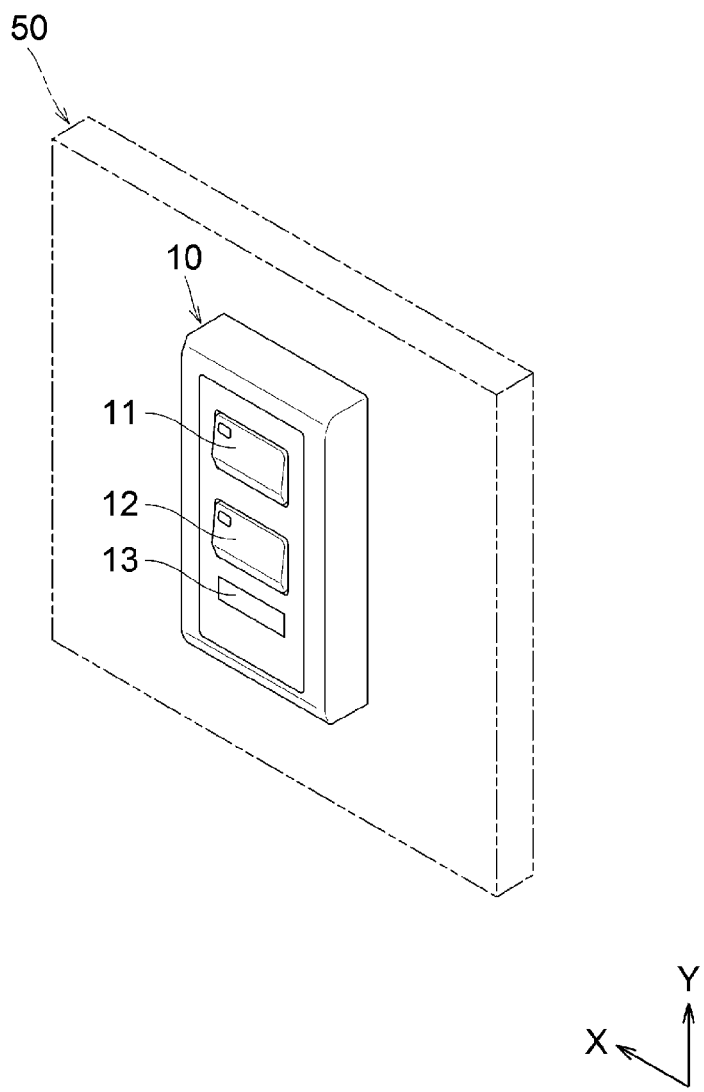
FIG. 5 is a diagram illustrating a state of the front face side of an attachment-receiving panel of a panel attachment fixture attached in a single attachment state.
Figure 8:
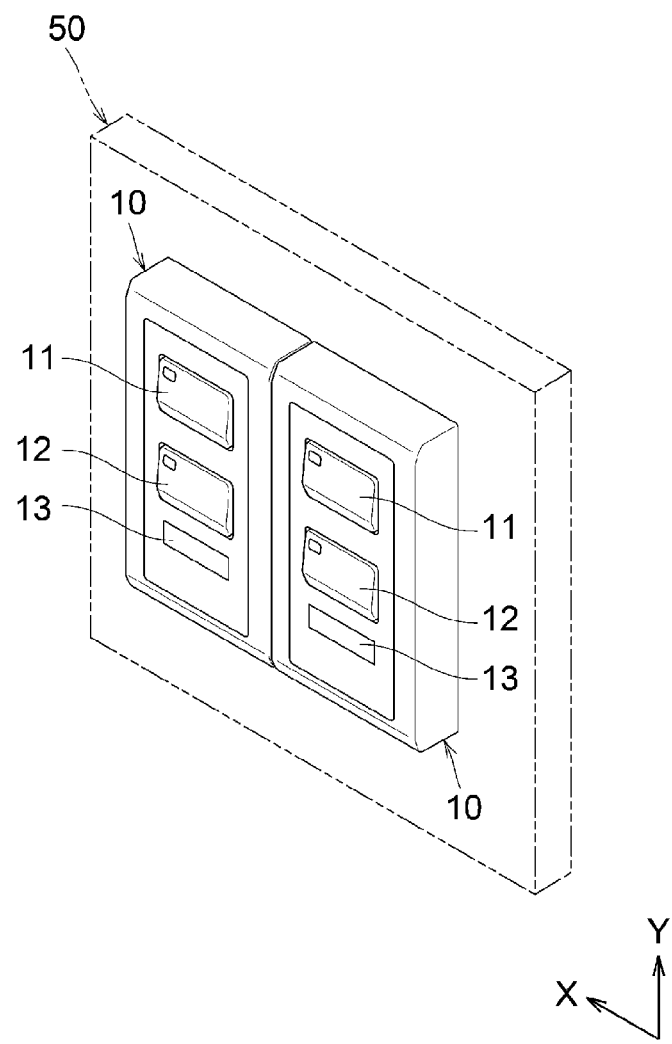
FIG. 8 is a diagram illustrating a state of the front face side of ab attachment-receiving panel of a panel attachment fixture attached in a parallel attachment state.

The panel attachment fixture of the present embodiment (hereinafter referred to as "the panel attachment fixture") is adopted in a ship operation panel structure in which one or two engine start switches 12 are disposed on an attachment-receiving panel 50, as illustrated in FIGS. 5 and 8.

Figure 4:
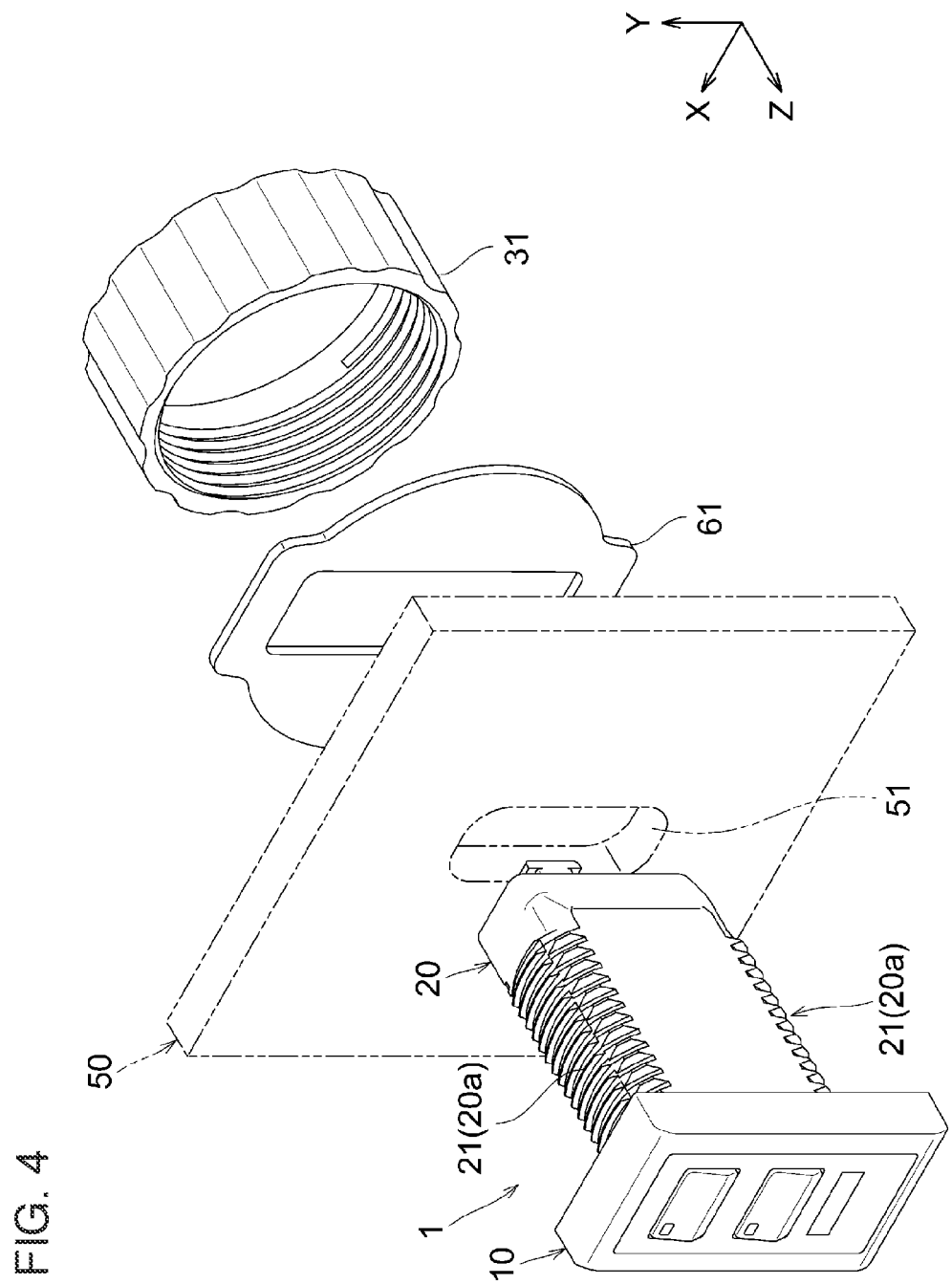
FIG. 4 is an exploded perspective view of components in an attached state to an attachment-receiving panel in a single attachment state.
Figure 6:
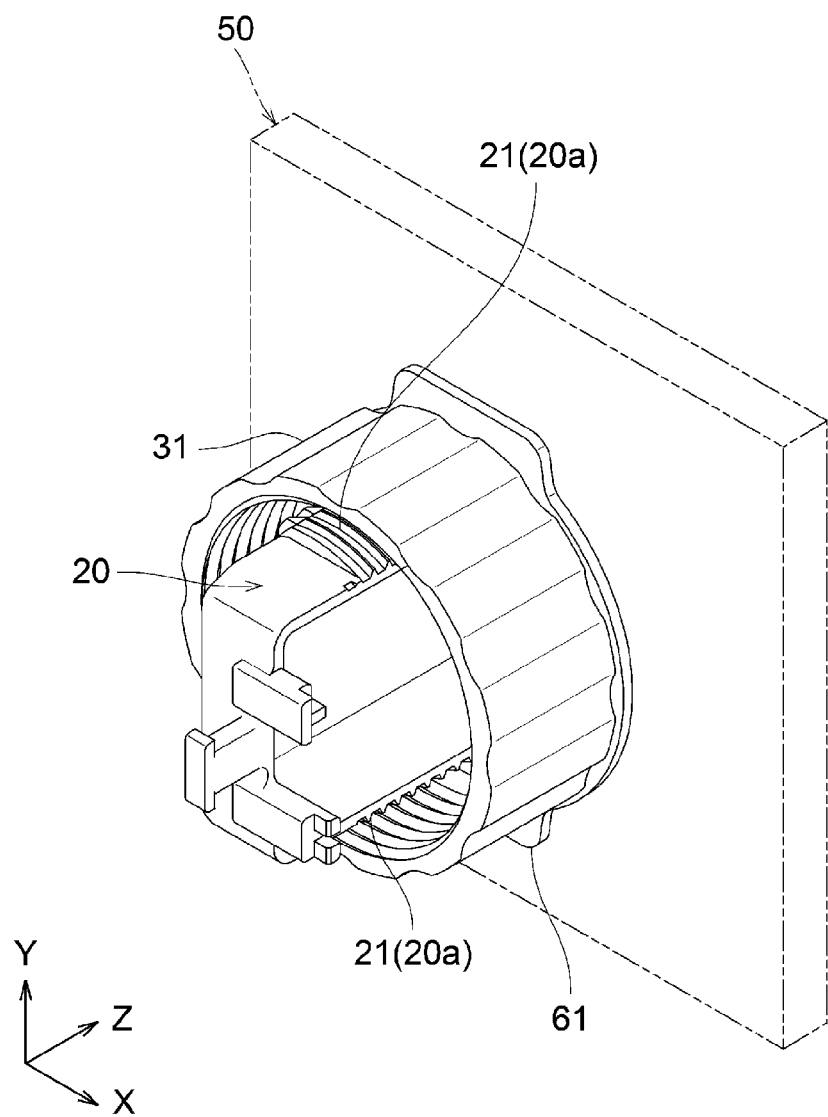
FIG. 6 is a diagram illustrating a state of the back face side of an attachment-receiving panel of a panel attachment fixture attached in a single attachment state.
Figure 7:
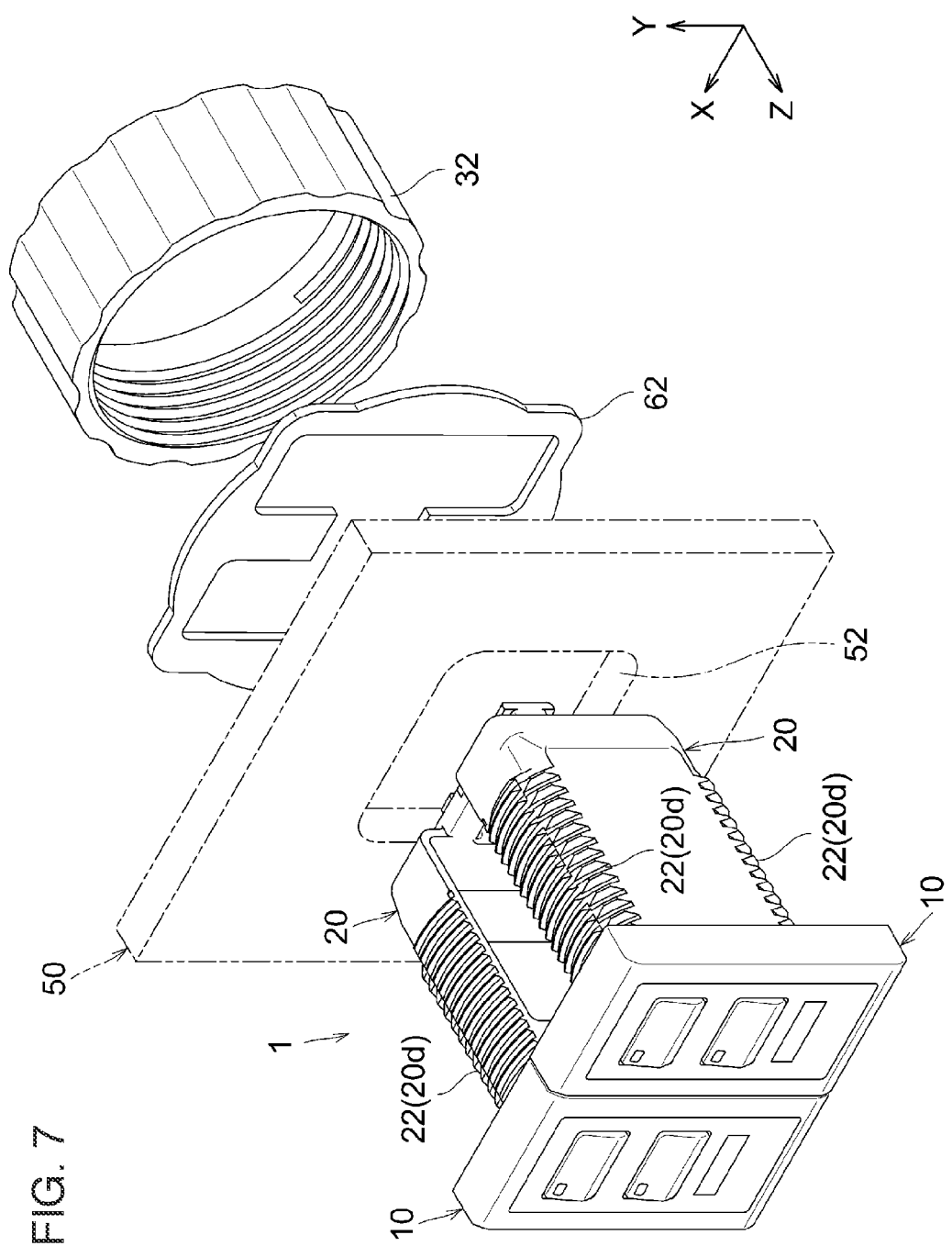
FIG. 7 is an exploded perspective view of components in an attached state to an attachment-receiving panel in a parallel attachment state.
Figure 9:
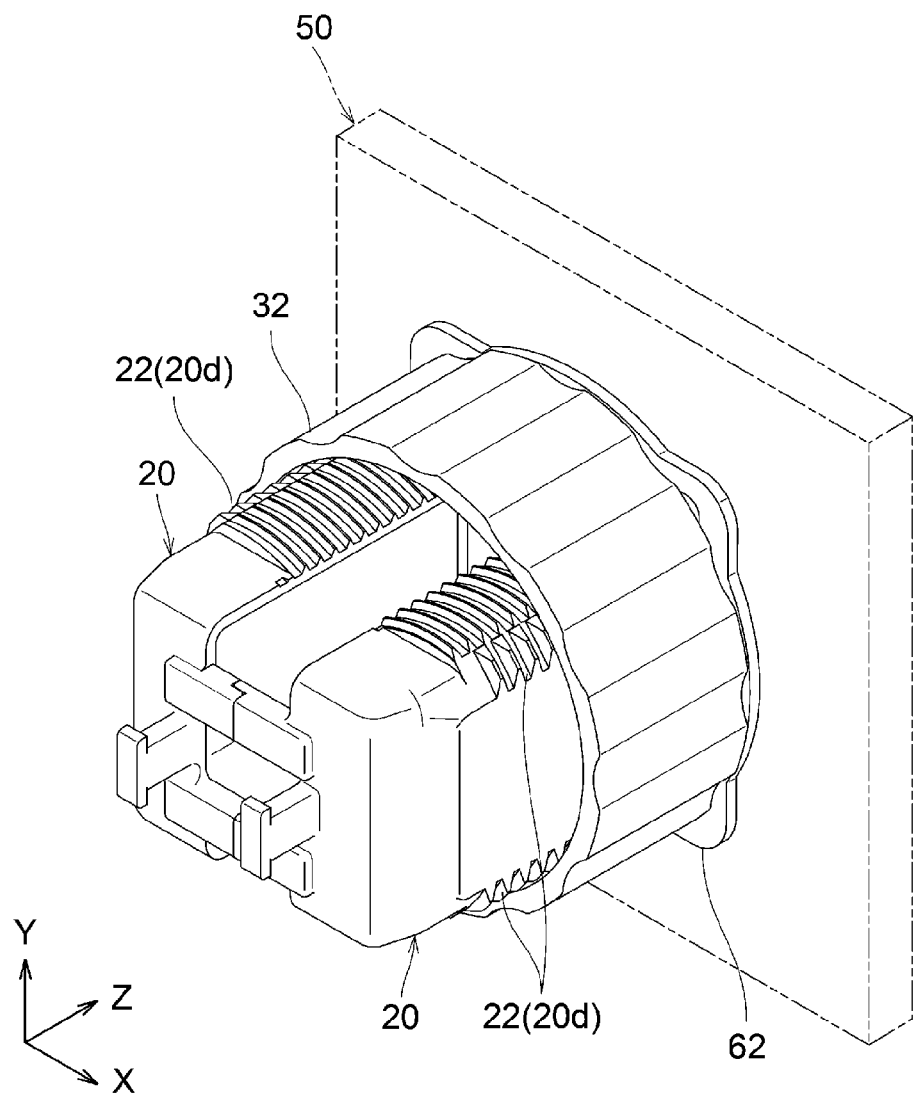
FIG. 9 is a diagram illustrating a state of the back face side of an attachment-receiving panel of a panel attachment fixture attached in a parallel attachment state.

In the panel attachment fixture, one or two fixture bodies 1 are attachable to the attachment-receiving panel 50 in a single attachment state or a parallel attachment state. In the single attachment state, one fixture body 1 is attached alone to the attachment-receiving panel 50 as illustrated in FIGS. 4, 5, and 6. In the parallel attachment state, two fixture bodies 1 are attached to the attachment-receiving panel 50 in parallel in a width direction X (an example of a first direction) in an in-plane direction of the attachment-receiving panel 50, as illustrated in FIGS. 7, 8, and 9.

[Basic Configuration of Panel Attachment Fixture]

The basic configuration of the panel attachment fixture will now be described.

Figure 1:
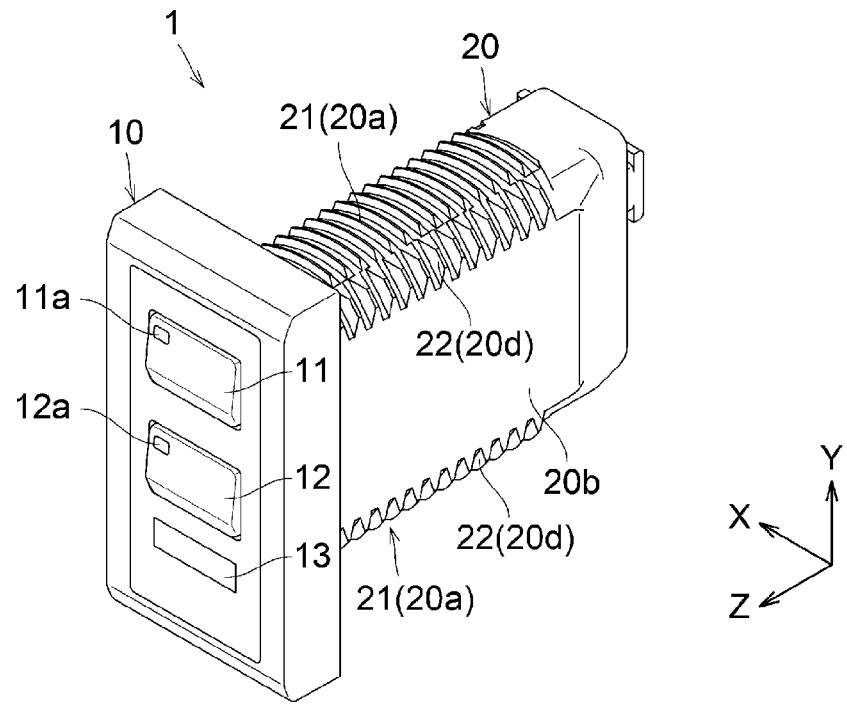
FIG. 1 is a perspective view of a fixture body of a panel attachment fixture as viewed from the front face side.
Figure 2:
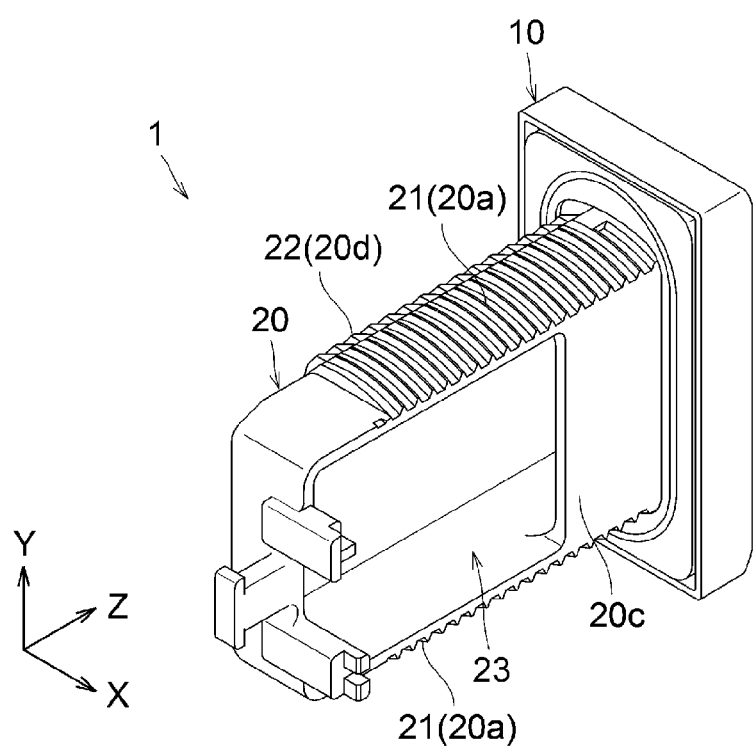
FIG. 2 is a perspective view of a fixture body of a panel attachment fixture as viewed from the back face side.

As illustrated in FIGS. 1 and 2, the panel attachment fixture includes one fixture body 1 having a flange section 10 and a body section 20 protruding from the back face of the flange section 10. As described in detail below, each fixture body 1 is attached to the attachment-receiving panel 50 by inserting the body section 20 to an attachment opening 51 (52) of the attachment-receiving panel 50, as illustrated in FIGS. 4 and 7. Then, in this state, an attachment nut 31 (32) (an example of a member fitting portion) is fitted from the rear side to a threaded portion 21 (22) (an example of an attachment member) disposed on the outer circumference of the inserted body section 20. In this way, the fixture body 1 is attached to the attachment-receiving panel 50 while the attachment-receiving panel 50 is disposed between the flange section 10 and the attachment nut 31 (32).

The flange section 10 of the fixture body 1 has a planar shape along the attachment-receiving panel 50 (see FIGS. 5 and 8, etc.) and has a vertically long substantially rectangular shape in which the short side extends in the width direction X (an example of a first direction) as viewed from the front face side. Predetermined electrical components are disposed on the front face of the flange section 10. The predetermined electrical components are, from the top to the bottom, a power switch 11 for turning on/off the power, and an engine start switch 12 for stating a propulsion engine, and a status display lamp 13 for displaying the status of the propulsion engine, the alarm status, etc. The power switch 11 is a push-button switch, and a lamp 11a that lights up when the power is turned on is disposed in the upper left corner of the power switch 11. The engine start switch 12 is a push-button switch, and a lamp 12a that lights up when the propulsion engine is activated is disposed in the upper left corner of the engine start switch 12.

The body section 20 of the fixture body 1 projects rearward from the back face of the flange section 10 and has a box-shaped body having a substantially rectangular parallelepiped shape flattened in the width direction X. That is, the outer circumference portion of the body section 20 has top and bottom narrow faces 20a, a first side face 20b, and a second side face 20c. The top and bottom narrow faces 20a face each other in a vertical direction Y (an example of a second direction) orthogonal to the width direction X in the in-plane direction of the attachment-receiving panel 50 (see FIGS. 6 and 9, etc.). The first side face 20b is a relatively wide face located on one side in the width direction X of the narrow faces 20a. The second side face 20c is a relatively wide face located on the other side in the width direction X of the narrow faces 20a.

Wirings, boards, and the like connected to the switches 11 and 12 and the lamps 11a, 12a, and 13 described above are laid in the internal space of the body section 20. A wiring outlet 23 is formed in the second side face 20c, through which wiring is passed and led to the outside.

Figure 3:
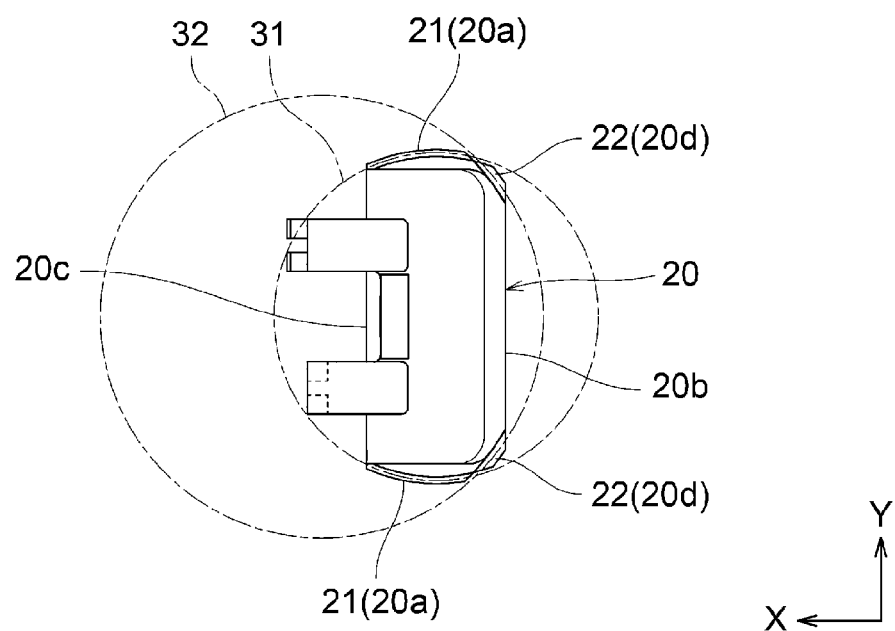
FIG. 3 is a back face view for explaining a fitting state of an attachment nut to a threaded portion.

Threaded portions 21 and 22 are formed on the outer circumference of the body section 20. An attachment nut 31 (32) (see FIGS. 6 and 9, etc.) can be screwed fitted to the threaded portions 21 and 22 to attached the fixture body 1 to the attachment-receiving panel 50. Specifically, as illustrated in FIG. 3, the threaded portions 21 for single attachment (examples of first member fitting portions) are provided on the narrow faces 20a disposed on the top and bottom of the body section 20. The threaded portions 21 screw together with the nut 31 for single attachment (an example of a first attachment member) that surrounds the body section 20 in the single attachment state described below.

The threaded portions 22 for parallel attachment (examples of second member fitting portions) are provided on corner portions 20d at the corners of the narrow faces 20a and the first side face 20b on one side in the width direction X of the narrow faces 20a (on the right in FIG. 3). The threaded portions 22 for parallel attachment screw with the nut 32 for parallel attachment (an example of a second attachment member) that surrounds the two body sections 20 arranged in parallel in a parallel attachment state described below and has a diameter larger than that of the nut 31 for single attachment. The body section 20 is formed in a vertically long substantially rectangular shape with a short side along the width direction X as viewed from the front. The corner portions 20d on the outer circumference of the body section 20 are chamfered portions. Therefore, the threaded portions 22 for parallel attachment can be formed in a relatively wide range at the corner portions 20d.

The nut 31 for single attachment for attaching one fixture body 1 to the attachment-receiving panel 50 in the single attachment state and the nut 31 for single attachment for attaching the two fixture bodies 1 to the attachment-receiving panel 50 in the attachment panel 50 in the parallel attachment state are nuts having different sizes (diameters). Therefore, the threaded portions 21 for the single attachment and the threaded portions 22 for parallel attachment are provided with threads having different pitches and heights.

As illustrated in FIG. 3, in front view, the threaded portions 21 for single attachment on the outer circumference of the body section 20 are disposed at retracted positions on the inner side of the nut 32 for parallel attachment in a state fitted on the threaded portions 22 for parallel attachment. In front view, the threaded portions 22 for parallel attachment on the outer circumference of the body section 20 are disposed at retracted positions on the inner side of the nut 31 for single attachment in a state fitted on the threaded portions 21 for single attachment.

In this way, in both the single attachment state and the parallel attachment state, the nuts 31 and 32 for attaching the fixture bodies 1 to the attachment-receiving panel 50 can be smoothly fitted to the respective threaded portions 21 and 22 provided on the outer circumferences of the body sections 20 without interference with the other threaded portions 21 and 22 to which the nuts 31 and 32 are not to be fitted.

In the parallel attachment state, the two fixture bodies 1 arranged in parallel in the width direction X are configured by using parts having common shapes. That is, the body sections 20 of the two fixture bodies 1 arranged in parallel in the parallel attachment state have common shapes. In the parallel attachment state, the orientation of the body section 20 of one of the fixture bodies 1 is rotated half a turn around the axis in the depth direction Z relative to the orientation of the other fixture body 1. The two fixture bodies are arranged in parallel while the second side faces 20c face each other.

Therefore, in such a parallel attachment state, the threaded portions 22 for parallel attachment disposed at the corner portions 20d opposite to the second side face 20c of the two body sections 20 are disposed at the four corners of the two body sections 20 at substantially equal distances apart from each other along the inner circumference of the nut 32 for parallel attachment. The threaded portions 22 for parallel attachment disposed at the four corners function as a series of threaded portions by screwing together with the nuts 32 for parallel attachment.

Figure 10:
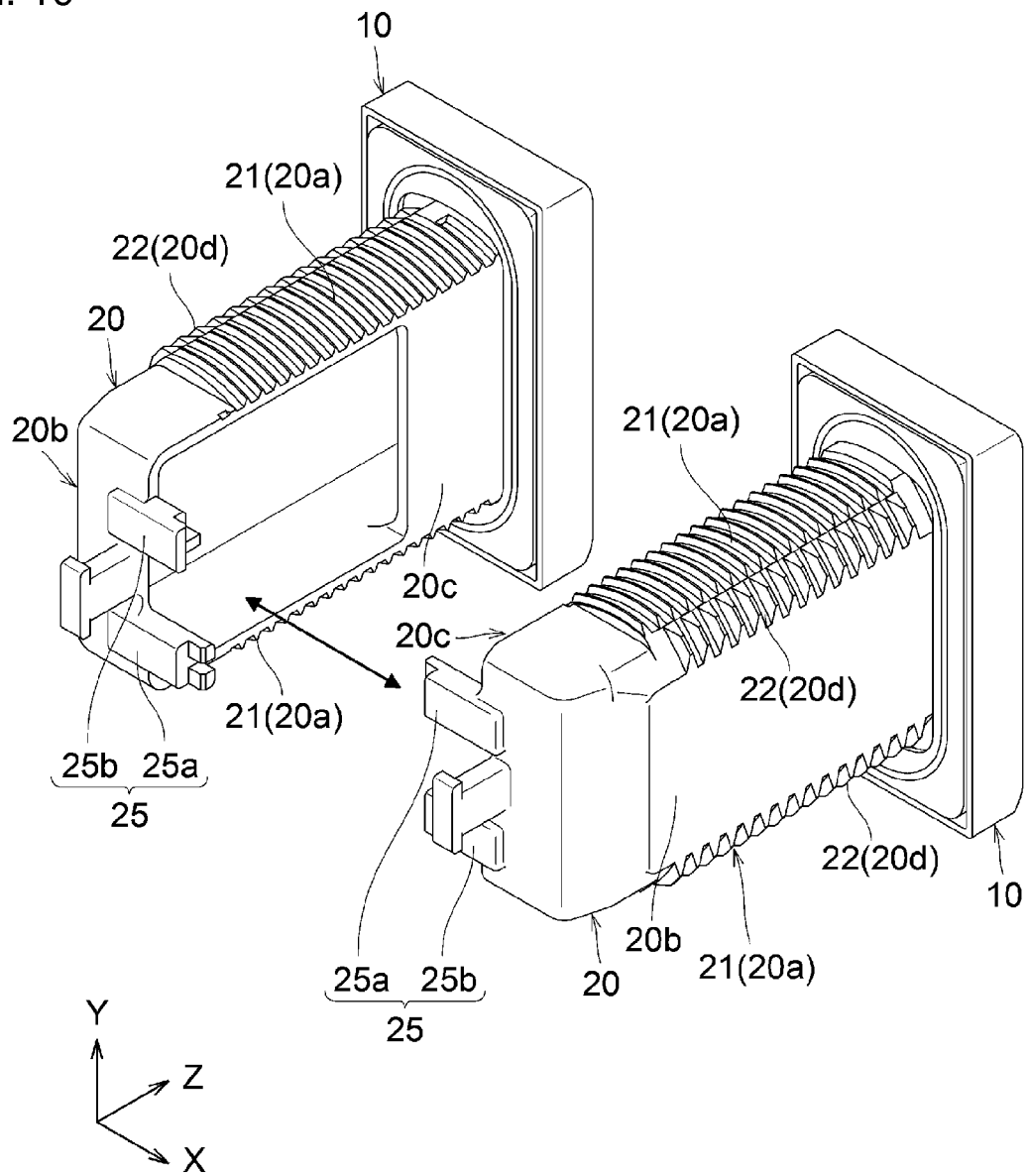
FIG. 10 is a perspective view of two fixture bodies in a state before connection.
Figure 11:
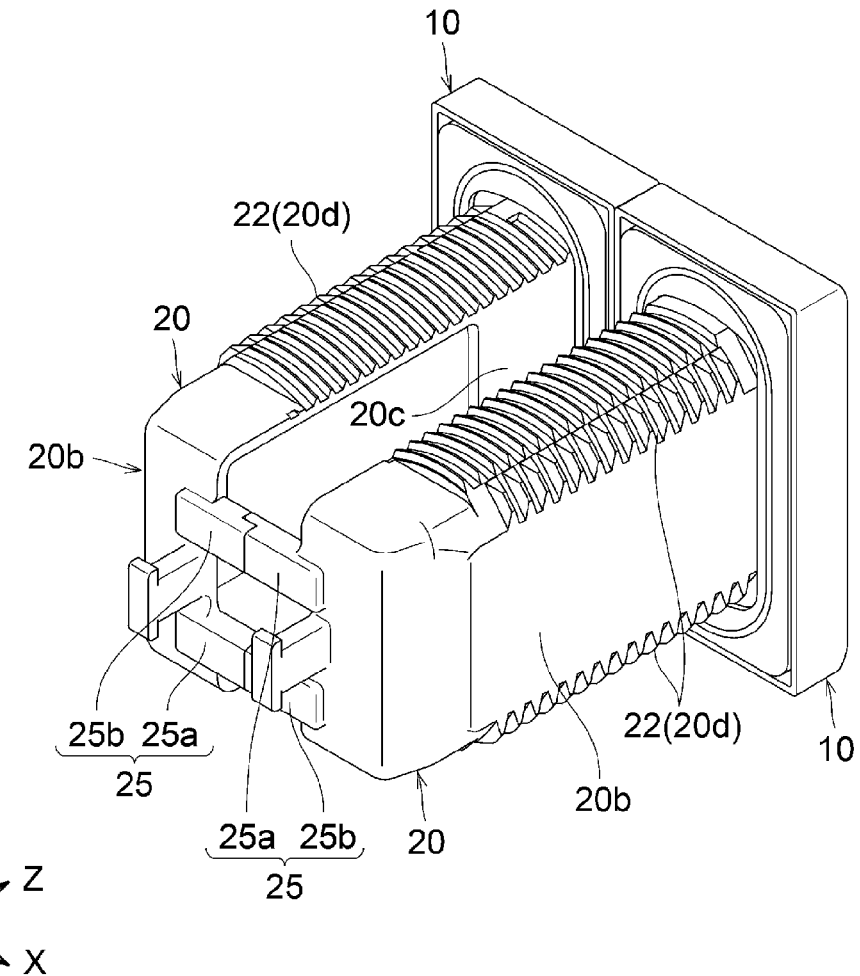
FIG. 11 is a perspective view of two fixture bodies in a state after connection.

Furthermore, as illustrated in FIGS. 10 and 11, in the parallel attachment state of this panel attachment fixture, the two fixture bodies 1 can be disposed in parallel in the width direction X while the second side faces 20c face each other and the flange sections 10 are adjacent to each other. Connection mechanisms 25 for connecting and positioning the two fixture bodies 1 in such a parallel arrangement state are disposed at the proximal side of the body sections 20 in the depth direction Z.

Figure 12:
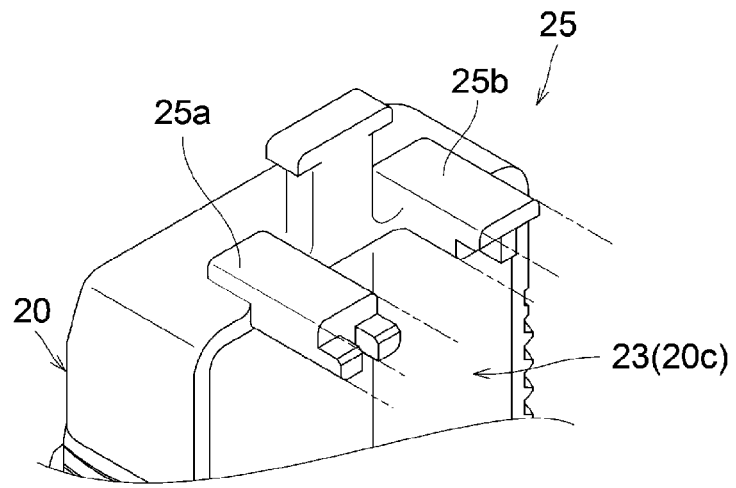
FIG. 12 is an enlarged perspective view of a connection mechanism.

As also illustrated in FIG. 12, the connection mechanisms 25 each include a first connection 25a and a second connection 25b. When the first connection 25a of one of the two fixture bodies 1 disposed in parallel is connected with the second connection 25b of the other one of the two fixture bodies 1, the second connection 25b of one of the two fixture bodies 1 is connected with the second connection 25b of the other one of the two fixture bodies 1. In this way, the first connection 25a and the second connection 25b have shapes that are half-rotated from each other about the axis along the width direction X passing through the center position in the vertical direction Y.

Figure 13:
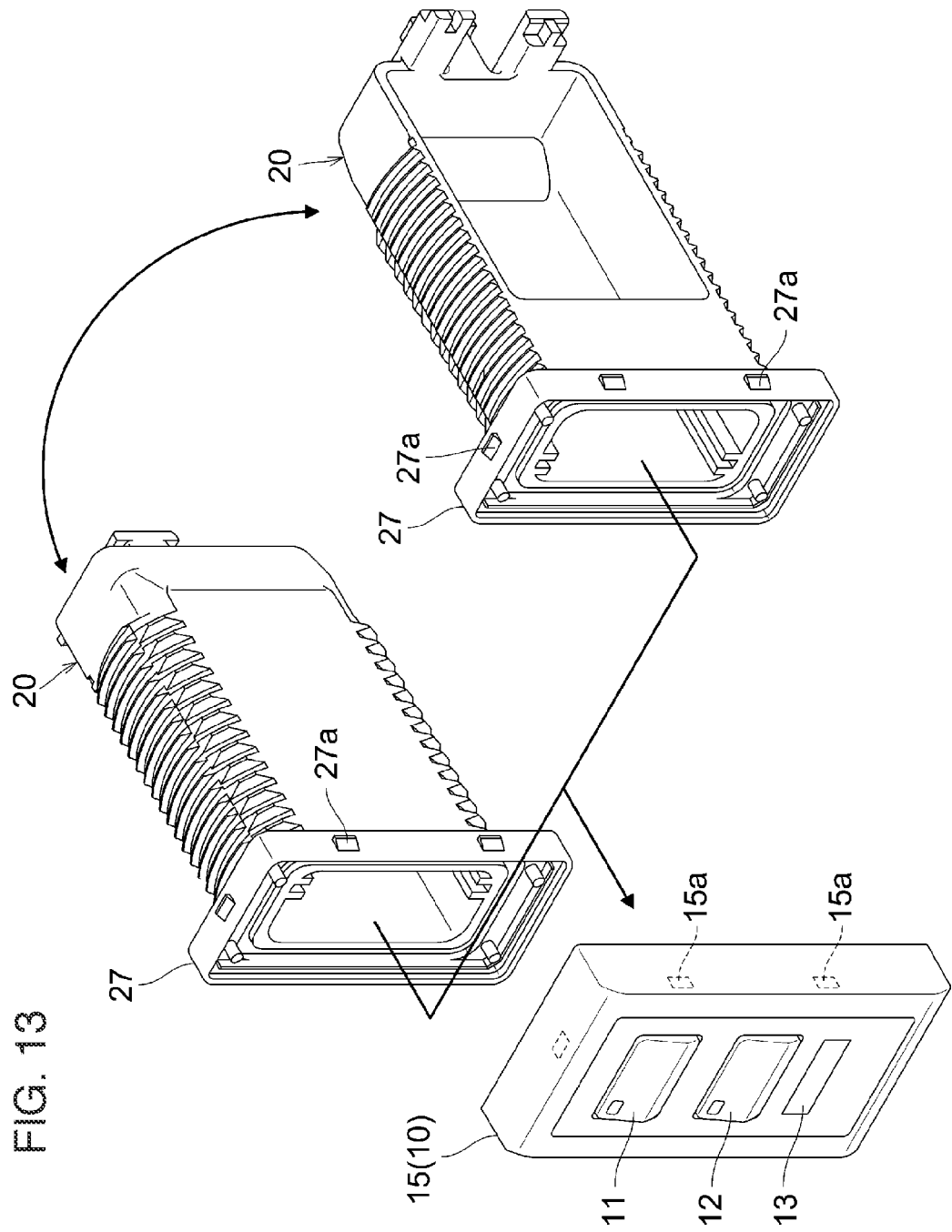
FIG. 13 is an exploded perspective view of a state in which a frame-body detachment portion of a body section is attached to or detached from a frame body of a flange section.

As illustrated in FIG. 13, with a fixture body 1 having such a configuration, the body section 20 is detachable from a frame body 15 of the flange section 10 and is also detachable in a state in which the body section 20 is rotated half a turn around the axis along the depth direction Z. On the front face of the flange section 10, electrical components, such as the switches 11 and 12, are disposed in a desired order.

That is, the outer face of a frame-body detachment portion 27 of the body section 20 can be fitted to the inner face of the frame body 15 of the flange section 10. Moreover, the inner face of the frame body 15 and the outer face of the frame-body detachment portion 27 each have a rectangular shape having a short side along the width direction X in front view. Therefore, even when the frame-body detachment portion 27 is rotated half a turn around the axis along the depth direction Z relative to the frame body 15, the outer face of the frame-body detachment portion 27 can be fitted to the inner face of the frame body 15.

Fastener recesses 15a are formed on the inner face of the frame body 15, and fastener hooks 27a that are fastened to the fastener recesses 15a are formed on the outer face of the frame-body detachment portion 27. Moreover, the fastener recesses 15a and the fastener hooks 27a are arranged so as to be in the same positions even when the frame-body detachment portion 27 of the body section 20 is rotated half a turn around the axis along the depth direction Z.

Therefore, in the parallel attachment state, two fixture bodies 1 can be disposed in parallel while one of the fixture bodies 1 is rotated half a turn around the axis along the depth direction Z relative to the orientation of the body section 20 of the other fixture body 1. Even in such case, the flange sections 10 of the respective fixture bodies 1 can be disposed in the same orientation without being inverted.

[Single Attachment State]

Details of the single attachment state will now be described with reference to FIGS. 4, 5, and 6.

In the single attachment state, one fixture body 1 is attached alone to the attachment-receiving panel 50.

In such the case, an attachment opening 51 for single attachment that is slightly larger than the outer circumference of the body section 20 is formed in the attachment-receiving panel 50, as illustrated in FIG. 4.

Then, the body section 20 of the fixture body 1 is passed from the front through the attachment opening 51 for single attachment in the attachment-receiving panel 50. Next, after a washer 61 has been appropriately placed on the body section 20 from the rear, the nut 31 for single attachment is fitted and screwed together with the threaded portions 21 for single attachment provided on the narrow faces 20a on the top and bottom of the body section 20.

Then, one fixture body 1 is attached alone to the attachment-receiving panel 50 while the attachment-receiving panel 50 is sandwiched between the flange section 10 of the fixture body 1 and the nut 31 for single attachment fitted to the body section 20 of the fixture body 1.

[Parallel Attachment State]

Details of the parallel attachment state will now be described with reference to FIGS. 7, 8, and 9.

In the parallel attachment state, two fixture bodies 1 are arranged in parallel in the width direction X and is attached to the attachment-receiving panel 50.

In such the case, an attachment opening 52 for parallel attachment that is slightly larger than the outer circumference of the two body sections 20 of the two fixture bodies 1 disposed in parallel in the width direction X is formed in the attachment-receiving panel 50, as illustrated in FIG. 7.

Then, the two fixture bodies 1 are arranged in parallel in orientations in which the second side faces 20c are facing each other while the flange sections 10 are disposed adjacent to each other and the connection mechanisms 25 are connected to each other. Then, the body sections 20 of the two fixture bodies 1 are passed from the front through the attachment opening 52 for parallel attachment in the attachment-receiving panel 50. Next, after a washer 62 has been appropriately placed on the body sections 20 from the rear, the nut 32 for parallel attachment is fitted and screwed together with the threaded portions 22 for parallel attachment provided at the four outer corners of the two body sections 20.

Then, the two fixture bodies 1 are attached to the attachment-receiving panel 50 with a small distance between the two fixture bodies 1 disposed close to each other while the attachment-receiving panel 50 is sandwiched between the flange sections 10 of the two fixture bodies 1 and one nut 32 for parallel attachment fitted to the body sections 20 of the two fixture bodies 1.

Other Embodiments

Other embodiments of the present invention will now be described. The configurations of the respective embodiments described below are not necessarily applied independently but may be applied in combination with the configurations of the other embodiments.

(1) In an embodiment described above, the electrical components provided on the front face of the flange section 10 of the panel attachment fixture are the switches 11 and 12 and the lamps 11a, 12a, and 13, but in addition to these, meters and the like may be provided as the electrical components.

(2) In an embodiment described above, an example has been described in which the panel attachment fixture according to the present invention is used in a ship operation panel structure in which one or two engine start switches 12 are disposed on the attachment-receiving panel 50. Alternatively, the panel attachment fixture may be used for another operation panel structure.

(3) In an embodiment described above, when a fixture body 1 is to be attached to the attachment-receiving panel 50, the nut 31 (32) for attachment serving as an attachment member is fitted to the threaded portions 21 (22) serving as member fitting portions provided on the outer circumference of the body section 20. However, the configuration of the member fitting portions and the attachment member may be such that the attachment-receiving panel 50 is sandwiched between the flange section 10 and the attachment member fitted to the member fitting portions. For example, it is also possible to fit a retaining member, such as a C ring, serving as an attachment member to a groove portion serving as a member fitting portion disposed on the outer circumference of the body section 20.

(4) In the above embodiment, the flange section 10 and the body section 20 are formed into a substantially rectangular parallelepiped shape flat in the width direction X, but the shape may be appropriately changed. In a case where the shape of the body section 20 is changed, the formation positions and shapes of the threaded portions 21 for single attachment and the threaded portions 22 for parallel attachment disposed on the outer circumference of the body section 20 may also be appropriately changed.

(5) In an embodiment described above, the wiring outlet 23 is provided on the second side face 20c remote from the threaded portions 22 for parallel attachment on the outer circumference of the body section 20. Alternatively, a wiring outlet may be provided on the first side face 20b adjacent to the threaded portions 22 for parallel attachment or at another position.

(6) In an embodiment described above, in the parallel attachment state, the two fixture bodies 1 are attached to the attachment-receiving panel 50 with one nut 32 for parallel attachment. However, for example, in the parallel attachment state, four fixture bodies 1, two of which arranged in parallel are disposed on the top and the other two of which arranged in parallel are disposed on the bottom, may be attached to the attachment-receiving panel 50 with one nut 32 for parallel attachment. In such the case, the threaded portions 22 for parallel attachment of each of the body sections 20 of the four fixture bodies 1 screwed with the nut 32 for parallel attachment may include only one corner portion 20d.

INDUSTRIAL APPLICABILITY

The present invention can be suitably used for a panel attachment fixture and a ship operation panel structure in which one or two electrical components can be efficiently arranged on an attachment-receiving panel while using common fixture bodies.

DESCRIPTION OF REFERENCE NUMERALS

1 fixture body
10 flange section
11 power switch (electrical component)
11a lamp (electrical component)
12 engine start switch (electrical component)
12a lamp (electrical component)
13 status display lamp (electrical component)
20 body section
20a narrow face
20b first side face (one side face)
20c second side face (other side face)
20d corner portion 21 threaded portion for single attachment (first member fitting portion)
22 threaded portion for parallel attachment (second member fitting portion)
23 wiring outlet
31 nut for single attachment (first attachment member)
32 nut for parallel attachment (second attachment member)
50 attachment-receiving panel
51 attachment opening for single attachment (attachment opening)
52 attachment opening for parallel attachment (attachment opening)
X width direction (first direction)
Y vertical direction (second direction)

The invention claimed is:

1. A panel attachment fixture comprising:
a fixture body provided with a predetermined electrical component, wherein the panel attachment fixture allows the fixture body to be attachable to an attachment-receiving panel in a form in which a part of the fixture body is inserted through an attachment opening of the attachment-receiving panel;
a first member fitting portion to which a first attachment member is attached in a first attachment state in which at least one fixture body is attached to the attachment-receiving panel by the first attachment member on an outer circumference of the fixture body; and
a second member fitting portion to which a single second attachment member is attachment in a second attachment state in which said at least one fixture body together with another fixture body is attached to the attachment-receiving panel by the second attachment member.

2. The panel attachment fixture according to claim 1, wherein the fixture body includes a flange section on which its front surface the electric fixture component is provided, and a body section that projects rearward from a back surface of the flange section and that provides on an outer circumference a member fitting portion on which an attachment member is attachable, and wherein the member fitting portion includes the first member fitting portion and the second member fitting portion.

3. The panel attachment fixture according to claim 2, wherein from a rear with respect to the body section inserted from a front into the attachment opening of the attachment-receiving panel, the fixture body is attachable to the attachment-receiving panel in a form in which the first attachment member as the attachment member is attached to the first member fitting portion, or in a form in which the second attachment member as the attachment member is attached to the second member fitting portion.

4. The panel attachment fixture according to claim 2, wherein the body section has a substantially rectangular parallelepiped shape flat in a predetermined direction, and on the outer circumference of the body section, the first member fitting portion is provided on each narrow surface facing along a second direction orthogonal to the predetermined direction in an in-plane direction of the attachment-receiving panel, and the second member fitting portion is provided respectively at a corner portion of a side surface on one side along the predetermined direction of each narrow surface provided with the first member fitting portion.

5. The panel attachment fixture according to claim 1, wherein the first attachment state is a single attachment state in which the fixture body is singly and independently attached to the attachment-receiving panel, and the first attachment member is singly attached to the first member fitting portion, and the second attachment state is a parallel attachment state in which a pair of the fixture bodies are arranged in parallel along the first direction in the in-plane direction of the attachment-receiving panel and attached to the attachment-receiving panel, and the second attachment member is singly attached to the second member fitting portion.

6. The panel attachment fixture according to claim 1, wherein on the outer circumference of the fixture body, the first member fitting portion is disposed on an inner side of the second attachment member in a state of being fitted to the second member fitting portion, and the second member fitting portion is disposed on an inner side of the first attachment member in a state of being fitted to the first member fitting portion.

7. The panel attachment fixture according to claim 1, wherein each of the first member fitting portion and the second member fitting portion is a threaded portion having a different diameter in which a thread is formed, and the first attachment member and the second attachment member are attachment nuts having different diamters that are screwed into the threads of the threaded portion.

8. The panel attachment fixture according to claim 1, wherein a wiring outlet through which a wiring connected to the electrical component passes through a space inside the fixture body is formed on the outer circumference of the fixture body.

9. A ship operation panel structure in which one or a pair of engine start switches are disposed on an attachment-receiving panel, wherein the panel attachment fixture according to claim 1, which is configured by providing the engine start switch or switches as the electrical component on the fixture body, is brought into the first attachment state or the second attachment state, which is configured by attaching the fixture body to the attachment-receiving panel.

* * * * *